(12) United States Patent
Lew et al.

(10) Patent No.: US 6,874,626 B2
(45) Date of Patent: *Apr. 5, 2005

(54) DISC HOLDER

(75) Inventors: Gene Lew, Markham (CA); Philip Dewhurst, Scarborough (CA)

(73) Assignee: Diskjocki, Pickering (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/379,034

(22) Filed: Mar. 4, 2003

(65) Prior Publication Data

US 2003/0217938 A1 Nov. 27, 2003

Related U.S. Application Data

(63) Continuation of application No. 09/688,474, filed on Oct. 16, 2000, now Pat. No. 6,561,346, which is a continuation-in-part of application No. 09/293,156, filed on Apr. 16, 1999, now Pat. No. 6,193,061.

(51) Int. Cl.[7] .............................................. B65D 85/57
(52) U.S. Cl. .................... 206/308.1; 206/232; 206/313; 312/9.58
(58) Field of Search .............................. 206/308.1, 313, 206/232, 307, 307.1, 308.3, 309, 312; 312/9.41, 9.45, 9.58

(56) References Cited

U.S. PATENT DOCUMENTS

| 3,422,952 A | 1/1969 | George |
| 4,084,691 A | 4/1978 | Leedom |
| 4,875,743 A | 10/1989 | Gelardi et al. |
| 5,099,995 A | 3/1992 | Karakane et al. |
| 5,101,972 A | 4/1992 | Hunt et al. |
| 5,170,893 A * | 12/1992 | Smith ........................... 211/40 |
| 5,332,086 A | 7/1994 | Chuang |
| 5,425,451 A | 6/1995 | Blasé |
| 5,547,078 A | 8/1996 | Iida |
| 5,590,770 A * | 1/1997 | Yeh ........................... 206/308.1 |
| 5,617,950 A | 4/1997 | Chung |
| 5,662,216 A * | 9/1997 | Nesbitt et al. ........... 206/308.1 |
| 5,720,386 A | 2/1998 | Allsop et al. |
| 5,720,387 A | 2/1998 | Young |
| 5,779,037 A | 7/1998 | D'Agaro et al. |
| 5,833,062 A * | 11/1998 | Yeh ........................... 206/307.1 |
| 5,833,067 A | 11/1998 | Joshi |
| 5,924,564 A * | 7/1999 | Lin ............................ 206/308.1 |
| 6,193,061 B1 | 2/2001 | Lew et al. |
| 6,405,859 B1 * | 6/2002 | Ku ............................ 206/308.1 |

FOREIGN PATENT DOCUMENTS

| EP | 0 181 835 A2 | 10/1985 |
| FR | 2 644 439 A1 | 9/1990 |
| GB | 2 276 609 A | 5/1994 |
| GB | 2 314 498 A | 1/1998 |

* cited by examiner

Primary Examiner—Jila M. Mohandesi
(74) Attorney, Agent, or Firm—Kilpatrick Stockton LLP

(57) ABSTRACT

A storage cradle system for compact discs comprising a series of storage cradles rotatably mounted in parallel in a housing. Each cradle consists of a base having outwardly angled vertically upstanding side walls, a rear wall and a vertical upstanding front wall. One of said side walls is higher than the other to act as a guide when inserting the disc into the slot formed between the two side walls. Indented tabs are provided on each of said side walls to keep the disc centered when fully inserted into the cradle.

3 Claims, 4 Drawing Sheets

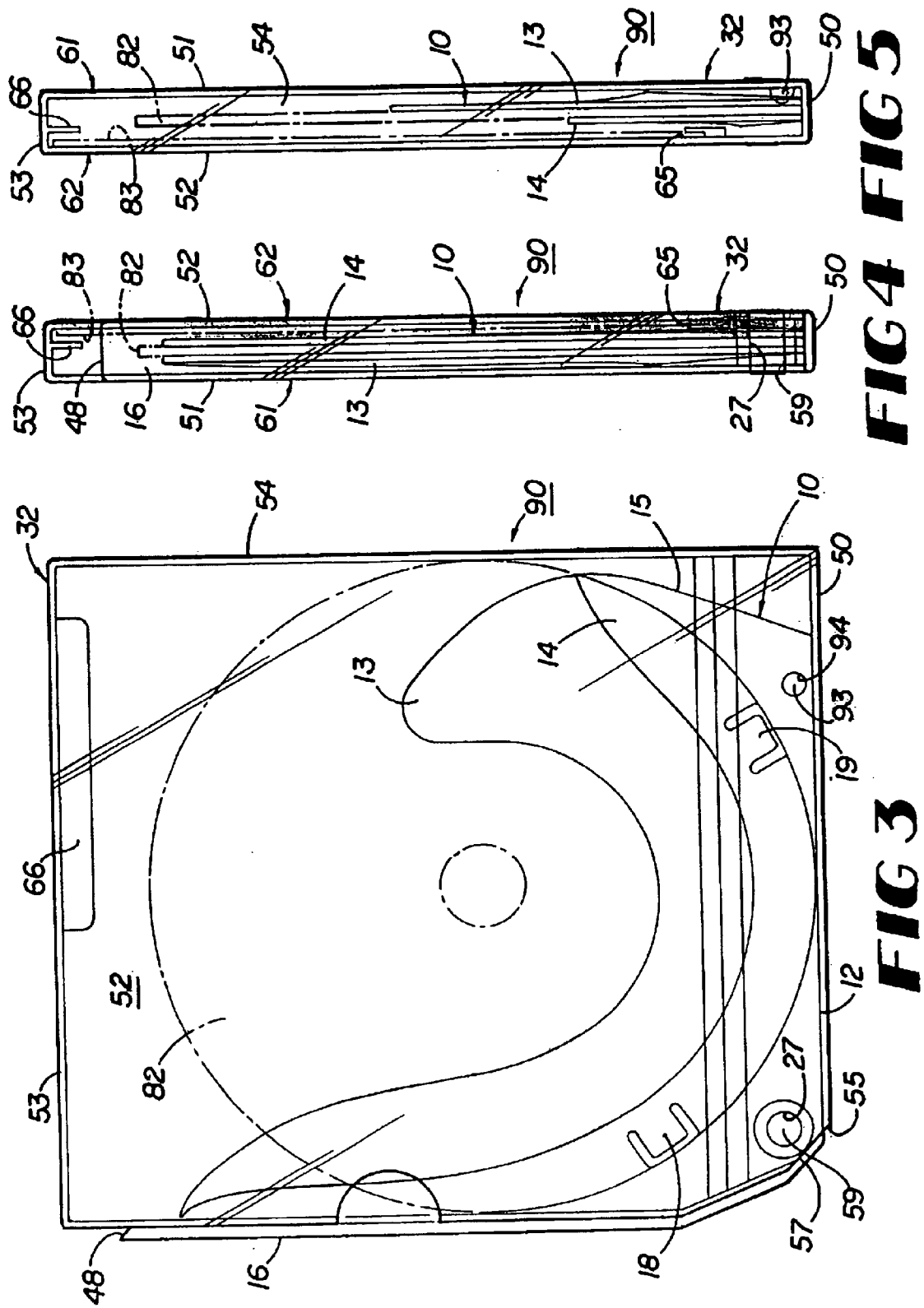

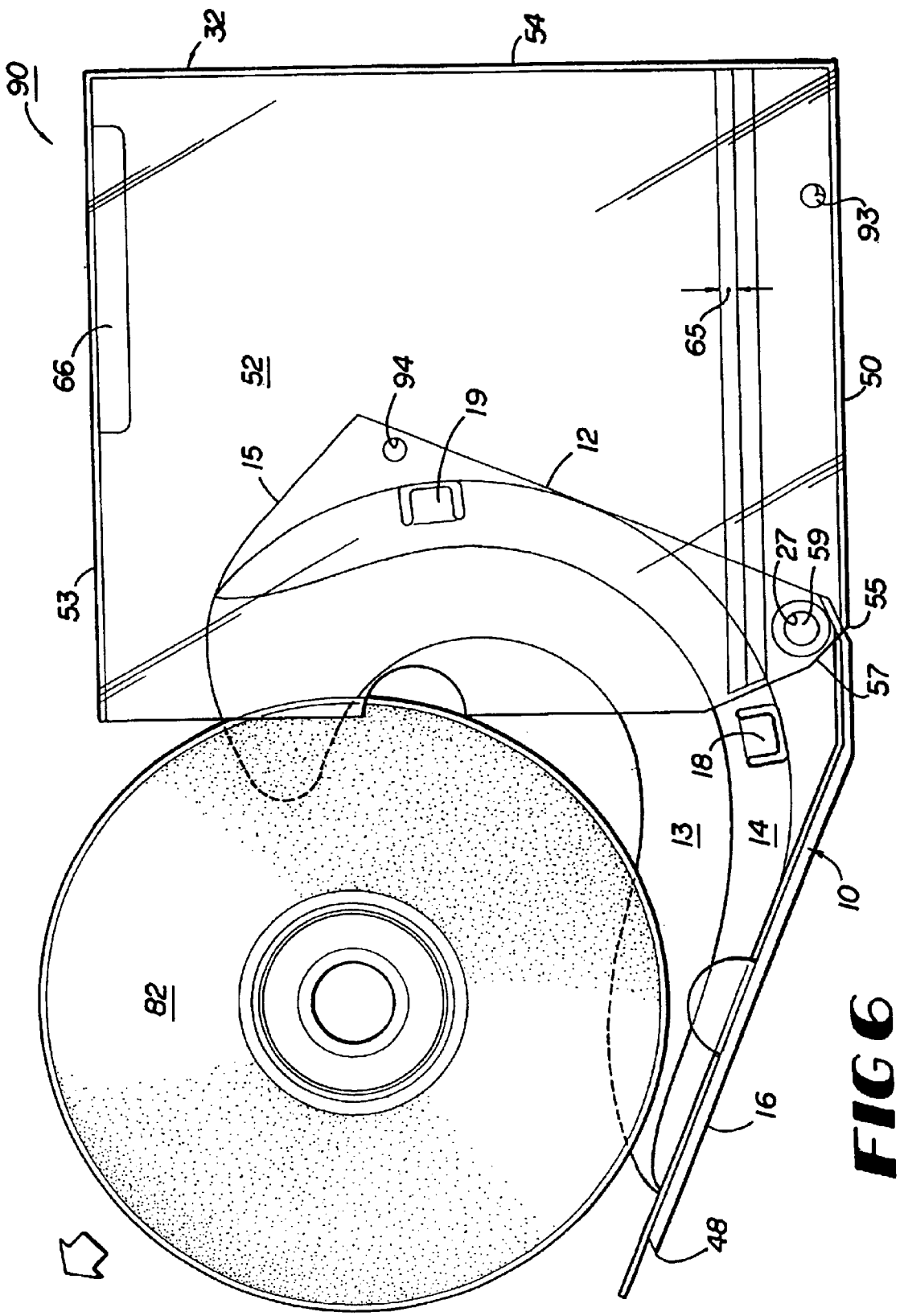

DISC HOLDER

CROSS REFERENCE TO RELATED APPLICATIONS

The present application is a continuation of application Ser. No. 09/688,474 dated Oct. 16, 2000, now U.S. Pat. No. 6,561,346 entitled "Disc Holder" which is a continuation-in-part of application Ser. No. 09/293,156 Apr. 16, 1999, now U.S. Pat. No. 6,193,061 entitled "Disc Holder,"

FIELD OF THE INVENTION

This invention relates to a storage device and more particularly to a storage and retrieval system for any compact, audio, or video disc medium which includes CD-ROM, CD-G, CD VIDEO DISCS, AUDIO CDs, KARAOKE CDs, and DVDs.

BACKGROUND OF THE INVENTION

In the past, the professional entertainers who provide music and video using the digital compact disc format (disk jockey or DJ) had to provide some makeshift method of filing and retrieving a particular compact disc that could easily be out of order. This would entail sorting through a selection of discs to locate the desired disc. Once the disc was located, the DJ then had to open the cover or lid of the storage device to determine the track on which the desired selection was recorded. Often the inserts in the container that listed the song titles are misplaced, causing the DJ to be unorganized and fumbling for another disc while trying to locate the information on the misplaced insert.

There are numerous storage units on the market for personal use into which the plastic storage case for the compact disc can be inserted. There also is a home unit available through a television promotion that only holds a limited number of discs (up to 40 compact discs) in a series of thin plastic cradles. The problems with this previous unit is (1) that it is manufactured from very thin plastic, and is not precision made for the discs to be returned into the unit; (2) the discs can contact the adjacent disc when retrieving and retracting the discs, therefore making it possible to damage the stored discs with scratches; (3) the operator would have a very difficult time, especially in low light conditions, placing the disc back in the very narrow slot; (4) there are no guides for the disc to retract into the closed position, and if one disc is out of alignment, the unit will not close; and (5) there are also no means of transportation for the disc holder as it is only six inches wide and five inches deep with no handle for ease of carrying.

The present invention solves these problems so that when DJs are providing entertainment for their audiences, they have easy access to discs and the discs are not damaged.

SUMMARY OF THE INVENTION

The present invention solves significant problems in the art by providing a case for storing compact discs and the like that is easier and more convenient to use.

Generally described, the present invention provides an improved storage cradle for compact discs and the like comprising a base having two vertically upstanding outwardly angled side walls. The side walls form a storage slot for the disc between the side walls. Indented tabs are located on the side walls adjacent the bottom of the slot. The tabs are operable to grip the disc, centering the disc when inserted in the cradle. The storage cradle also comprises a rear wall and a vertically upstanding front wall.

The present invention provides a cradle with one side wall higher than the other to act as a guide when inserting a disc into the slot of the cradle. The side walls are angled from three to four degrees and the top edge of the side walls is generally C-shaped. The angled side walls prevent either side of the stored disc from touching the cradle surface, eliminating the possibility of damage to the disc due to abrasion with the side walls of the cradle.

The present invention also provides a housing inside which the storage cradle is pivotally mounted. A pull tab attached to the front wall of the cradle facilitates pivoting the cradle within the housing.

The present invention also provides a storage cradle with tabs to center the disc. The tabs grip the outer, unreadable edge of the disc. This prevents scratching or other damage to the disc.

The present invention also provides a disc storage system comprising a plurality of storage cradles rotatably mounted on an axis. Each cradle comprises a base having two vertically upstanding side walls forming a storage slot for the disc between the walls. Felt strips are located along one of the side walls to protect the readable portion of the disc. Indented tabs located on the side walls adjacent the bottom of the slot are operable to grip the disc, centering the disc when inserted in the cradle. Each cradle also comprises a rear wall and a vertically upstanding front wall. Alternating pull tabs re positioned to allow users to more conveniently access the stored discs.

Thus, it is an object of the present invention to provide an improved storage cradle for compact discs in which it is easy to return the disc into the slot.

It is another object of the present invention to provide an improved storage cradle for compact discs adapted to keep the disc centered when fully inserted into the cradle.

It is a further object of the present invention to provide an improved case comprising a housing and cradle for storing compact discs.

It is yet another object of the present invention to provide a storage system comprising multiple interconnected cradles for storing a plurality of discs.

Other objects, features and advantages of the present invention will become apparent upon reading the following detailed description of embodiments of the invention, when taken in conjunction with the accompanying drawings and the appended claims.

BRIEF DESCRIPTION OF THE DRAWINGS

FIG. 3 is a top plan view of a case having a storage cradle of the present invention pivotally mounted within the case.

FIG. 4 is a front plan view of the case of FIG. 3.

FIG. 5 is a rear plan view of the case housing.

FIG. 6 is a top plan view of the case of FIG. 3 with the storage cradle rotated forward to provide access to either remove or insert the disc to be stored.

DETAILED DESCRIPTION OF THE PREFERRED EMBODIMENT

Figure 1:
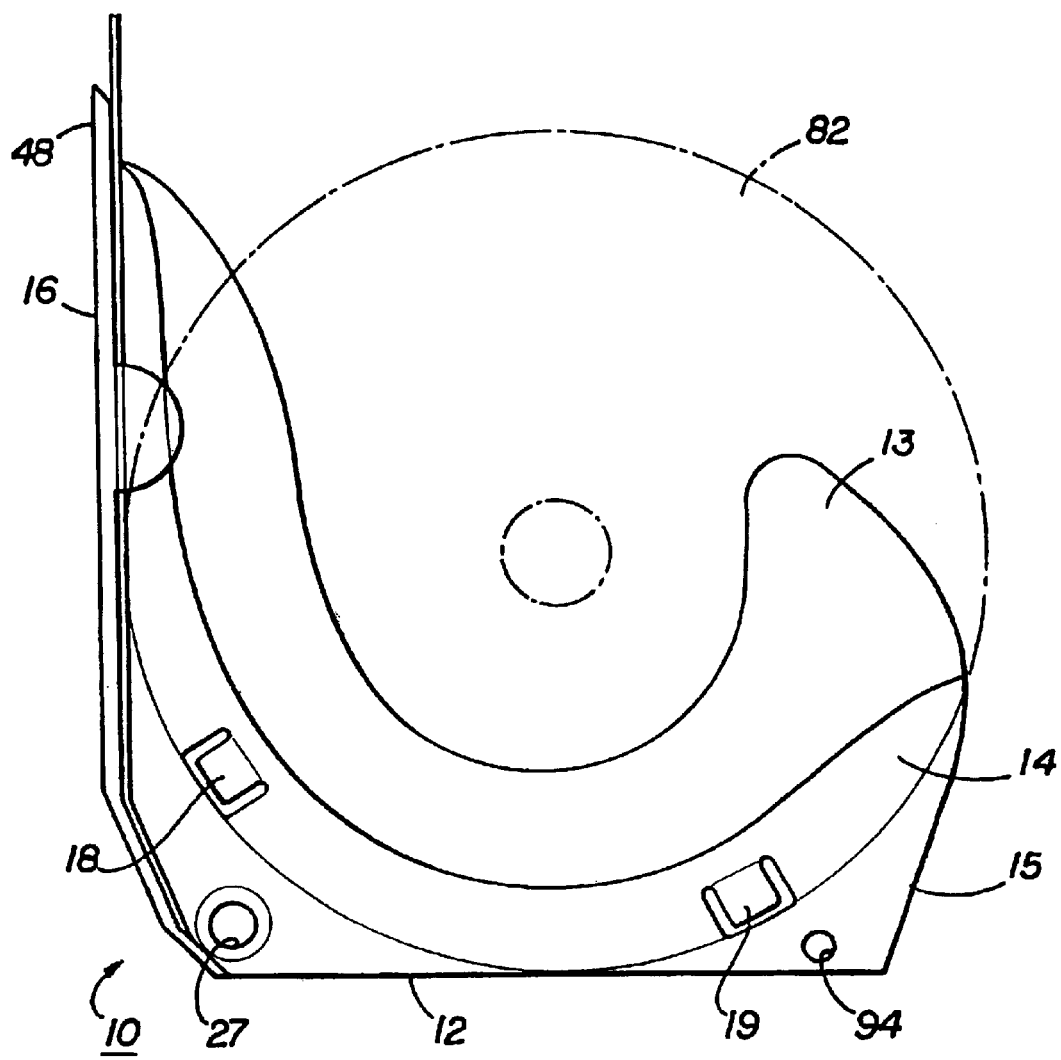
FIG. 1 is a top plan view of one embodiment of the present invention.

Referring now in more detail to the drawings, in which like numerals refer to like parts throughout the several views, FIG. 1 shows a top plan view of a cradle 10 for storing compact discs and the like embodying the present invention.

Figure 2:
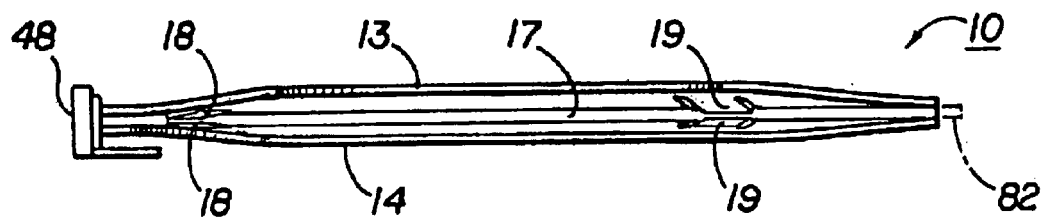
FIG. 2 is a cross-sectional view of the cradle according to the present invention along the line A—A of FIG. 1.

FIG. 1 shows the top surface of the cradle 10 comprising a substantially flat base 12. Two vertically upstanding side walls 13, 14 extend upwards, one from each side edge of the base 12. The side walls are outwardly angled as best shown in FIG. 2. In the preferred embodiment, the angle of the side walls is between three to four degrees. The top edge of the side walls 13, 14 are generally C-shaped to permit easy access to a disc 82. A slot 17 is formed between the two side walls 13, 14. The slot 17 is sized to accommodate the disc 82 to be stored in the cradle 10. As shown in FIG. 1, side wall 13 is taller than side wall 14. This allows the user to more easily insert the disc 82 into the slot 17.

A rear wall 15 extends vertically upward from one end of the base 12. A front wall 16 extends vertically upwards from the opposite end of the base 12. The front wall 16 is approximately twice as tall as the rear wall 15. It should be noted that the front wall is preferably slightly taller than the diameter of the disc 82 to be stored in the cradle 10.

Indented tabs 18, 19 are located on the side walls 13, 14. The indented tabs on each side wall are aligned and operate to grip the disc when inserted into the cradle, centering the disc 82. The tabs 18, 19 are positioned to grip the unreadable outer edge of the disc 82 creating a friction fit. The indented tabs 18, 19 are positioned in this way so that the readable portion of the disc 82 is not scratched.

As shown in FIG. 3, the cradle 10 of the present invention can be mounted within a housing 32 forming a case 90. The housing 32 is generally rectangular with a base wall 50. Two vertically upstanding side walls 51, 52 extend upwardly from the side edges of the base wall 50. It is preferable that the side walls 51, 52 are parallel to each other. A rear wall 54 extends upwards from the base wall 50, in between the side walls 51, 52. A top wall 53 extends across the top of the housing, between the side walls 51, 52. The housing is sized to hold the cradle 10 and the disc.

In one embodiment of the present invention, the side walls 51 52 extend beyond the front edge 55 of the base 50 as shown in FIG. 3. A bottom portion 57 of the side walls is removed at approximately a 45 degrees angle to facilitate opening and closing of the case as described below. An axle pin 59 is located on one of the side walls slightly above the front end of the base wall 50. The axle pin 59 extends between the side walls 51, 52.

A hole 27 is located slightly above the front end of the base 12 of the cradle 10. The cradle 10 is mounted within the housing by placing the axle pin 59 through the hole 27. In order to do this, the housing 32 is preferably in two parts with two halves 61,62 being fastened together. Those skilled in the art will understand that the case can be fastened together by glue, thermal welding, snap fit or other suitable methods.

A pull tab 48 is located on the top portion of the front wall 16 of the cradle 10. The pull tab facilitates rotating of the cradle 10 along the axle 59 from the open to closed position within said housing 32. The pull tab is preferably contoured and ribbed to provide an easier surface for a user to grab.

A pin 93 is located near the bottom of side wall 51 of the housing 32. The pin 93 is in the shape of a dome and extends into the interior of the housing, but does not extend as far as side wall 52. As the cradle 10 is pivoted from the open to the closed position, the base 12 of the cradle hits the pin 93. When additional pressure is applied to the cradle 10, the base 12 of the cradle slips to the side of the pin 93. The pin 93 engages a small hole 94 located in the wall 13 of the cradle 10. The hole 94 is sized to retain the pin 93. This prevents the cradle from inadvertently opening on its own. Similarly, when the case is opened, pressure is applied to the cradle in the opposite direction causing the pin 93 to slip out of the hole 94 and the case to open.

A channel 65 is located within the housing 32, between the side wall 14 of the cradle and the side wall 52 of the housing. A storage tab 66 extends downward from the top wall 53 of the housing. A CD booklet 83 which typically accompanies a CD, can be stored in the channel 65 and between the storage tab 66 and the side wall 52. The front wall 16 of the cradle 10 is sized to accommodate a CD identification label.

By providing the rotating cradle 10 within the housing 32, a user may gain access to the CD by opening the case with a single hand. One-hand access provides a number of advantages including safety when accessing a CD in an automobile. The present invention provides trouble-free access to the CD by the tilting action of the cradle from a single point of rotation.

It should be understood that the cradle and housing can be made of a heavy-duty plastic or other suitable material. Those skilled in the art will understand that it is preferable to use a translucent material so that the user is able to see the disc and the disk booklet without opening the case.

Figure 7:
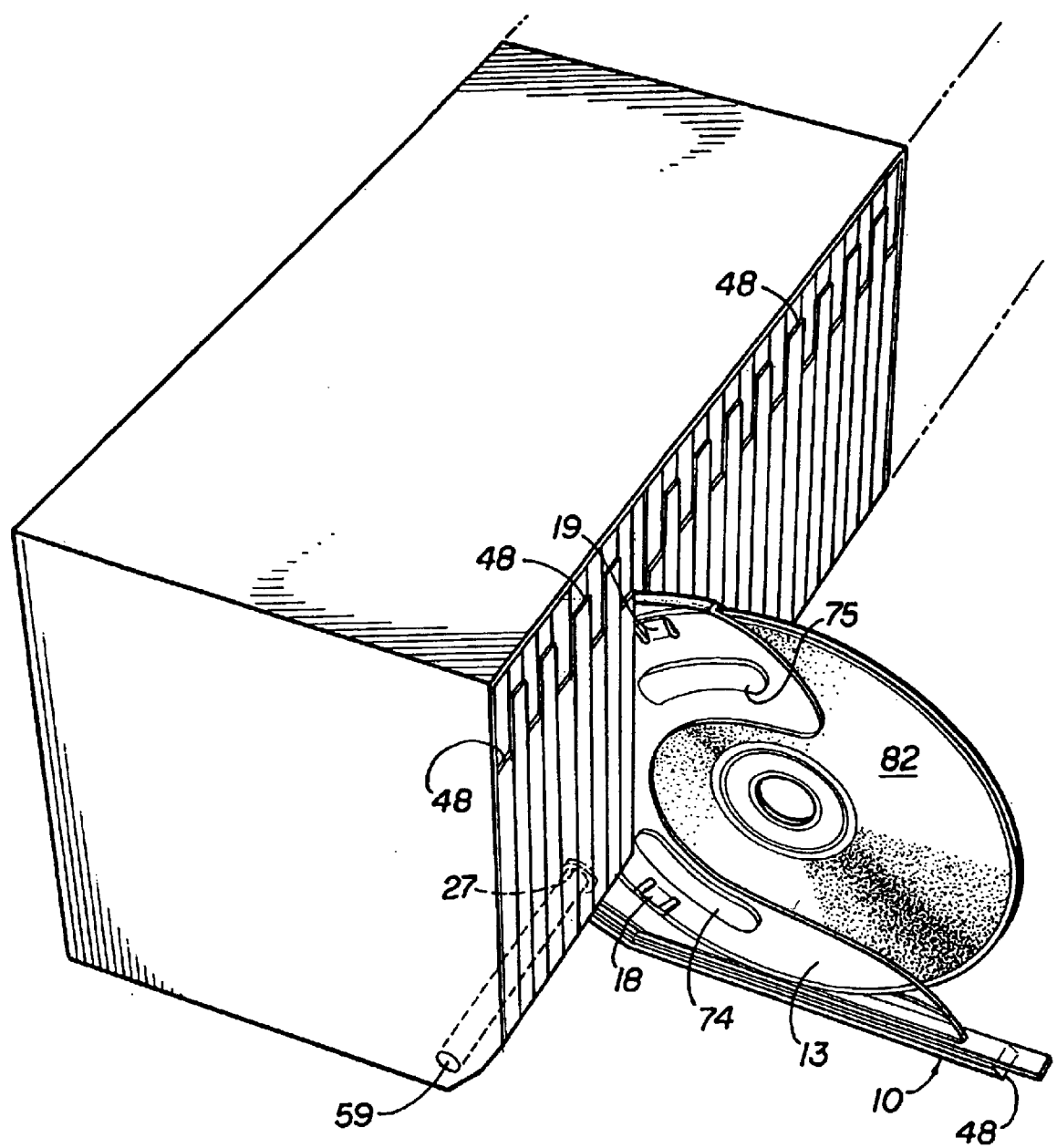
FIG. 7 is a perspective view of a system for holding cradles of the present invention.

Another embodiment of the present invention provides a disc storage system for a plurality of cradles 10 as shown in FIG. 7. The storage system of this embodiment holds up to 200 discs in individual cradles. The storage system comprises a housing onto which a series of cradles are rotatably mounted in parallel. Each cradle 10 is provided with a hole through the side walls 13, 14. The hole is located above the base 12 adjacent to the front wall 16. A rod is inserted through the holes 12 on each cradle connecting a plurality of cradles. The rod is then mounted to the side walls of a housing. The cradles can rotate around the rod to permit the discs to be inserted and removed from the slot 17. To facilitate the rotation or pivoting of the cradles, a portion of the front wall 16 adjacent to the base 12 is rearwardly angled.

It is important to note that the side walls 13, 14 of the cradles in the disc storage system are completely vertical, that is they are not angled outward. This allows for more cradles to be included in the disc storage system. Non-abrasive pads 74, 75 are located along side wall 13 to prevent harm to the disc surface.

A spacer is provided between adjacent cradles in order that the cradles do not bind against each other when retrieving or retracting discs from the system. The spacers may comprise a washer around the outside of the hole on side wall 13. The spacer may be formed integrally with the cradle. In order to facilitate the pivoting of the cradles, a pull tab 48 is provided on the front wall 16 of each cradle. The pull tabs 48 are located at differing locations on adjacent cradles to minimize the possibility of inadvertently pivoting the wrong cradle. The pull tabs 48 may be located at alternating locations on adjacent cradles.

The disc storage system also comprises a hinged cover in the form of a rectangular box. A handle is provided on the top of the cover to facilitate opening and closing the cover.

While the invention has been described in detail with particular reference to the preferred embodiment thereof, it will be understood that modifications and variations may be made without departing from the scope of the invention as defined in the appended claims.

What is claimed is:

1. A storage cradle for disks comprising:

a base comprising a storage slot for the disc formed by a first tall vertically upstanding wall and a second short vertically upstanding wall, the first and second vertically upstanding walls angled outward from the base;

gripping means located on the vertically upstanding walls adjacent the bottom of the slot for gripping arid centering the disc in the slot;

a rear wall and;

a vertically upstanding front wall.

2. The cradle of claim 1, wherein the gripping means are positioned to grip the unreadable outer edge of disc.

3. The cradle of claim 1, wherein the base, The gripping means, the rear wall and the front wall comprise clear plastic.

* * * * *